Figure 1:
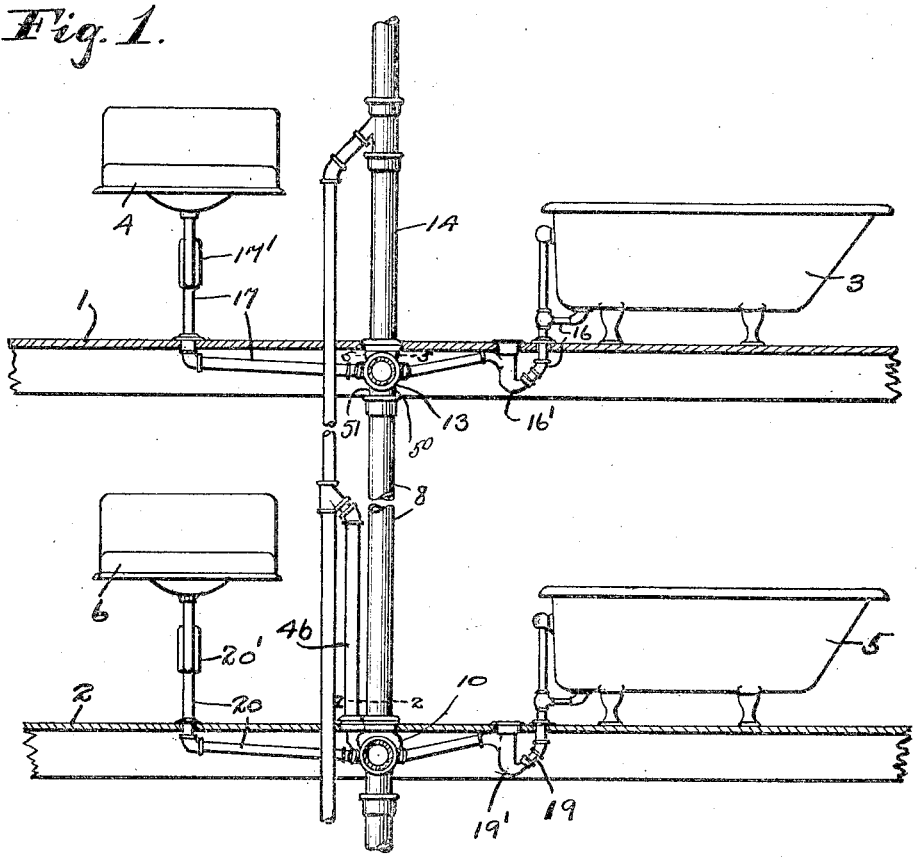

H. J. LUFF.
WASTE AND VENT PIPE FITTING.
APPLICATION FILED JUNE 24, 1912.

1,097,982.

Patented May 26, 1914.
5 SHEETS—SHEET 1.

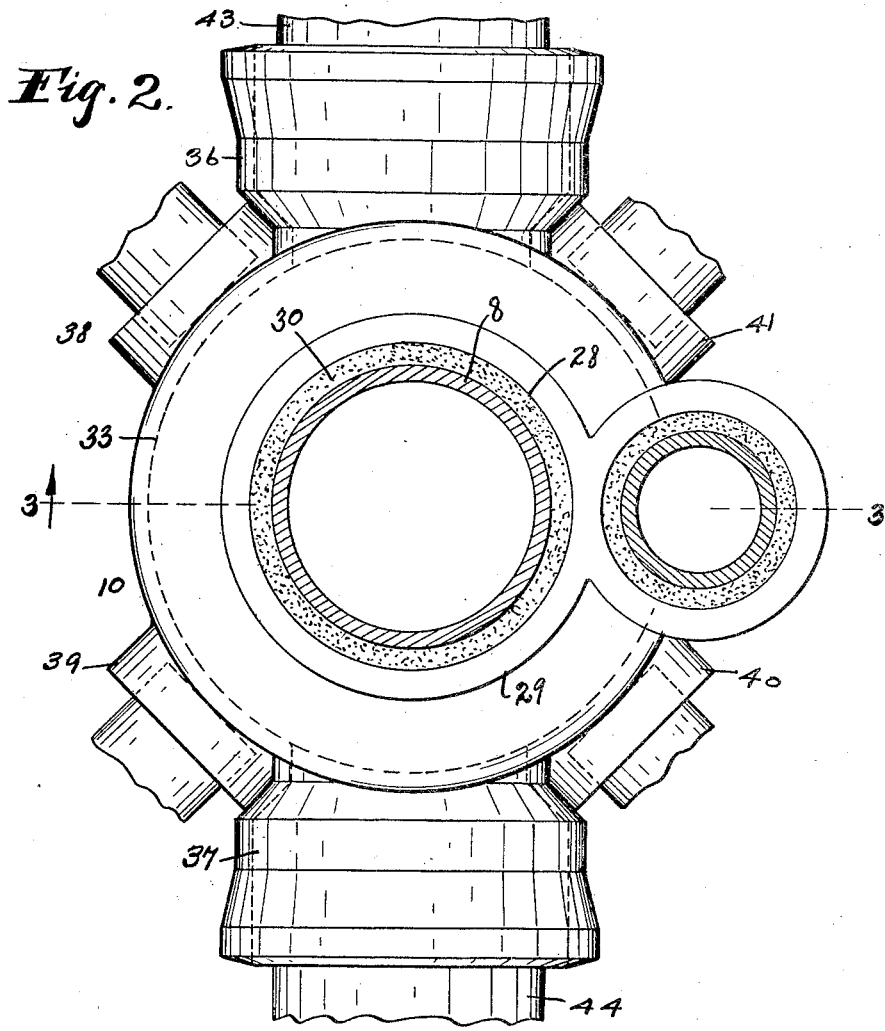

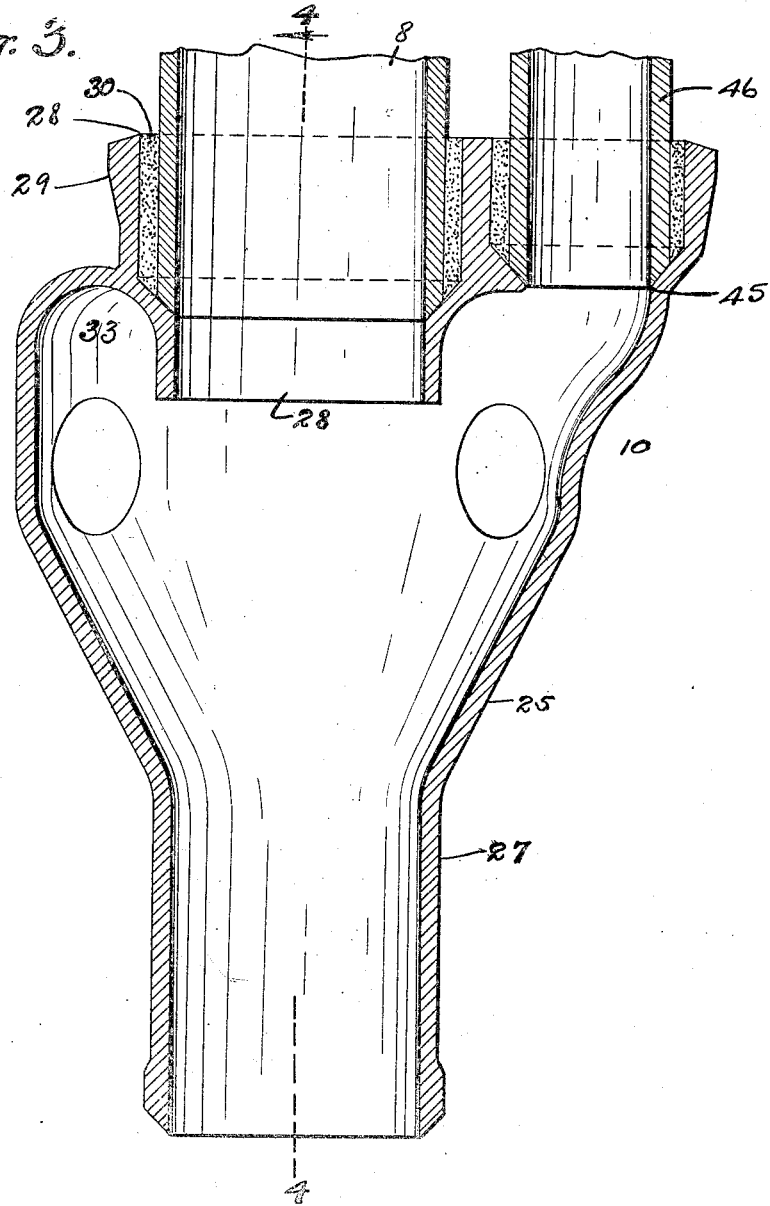

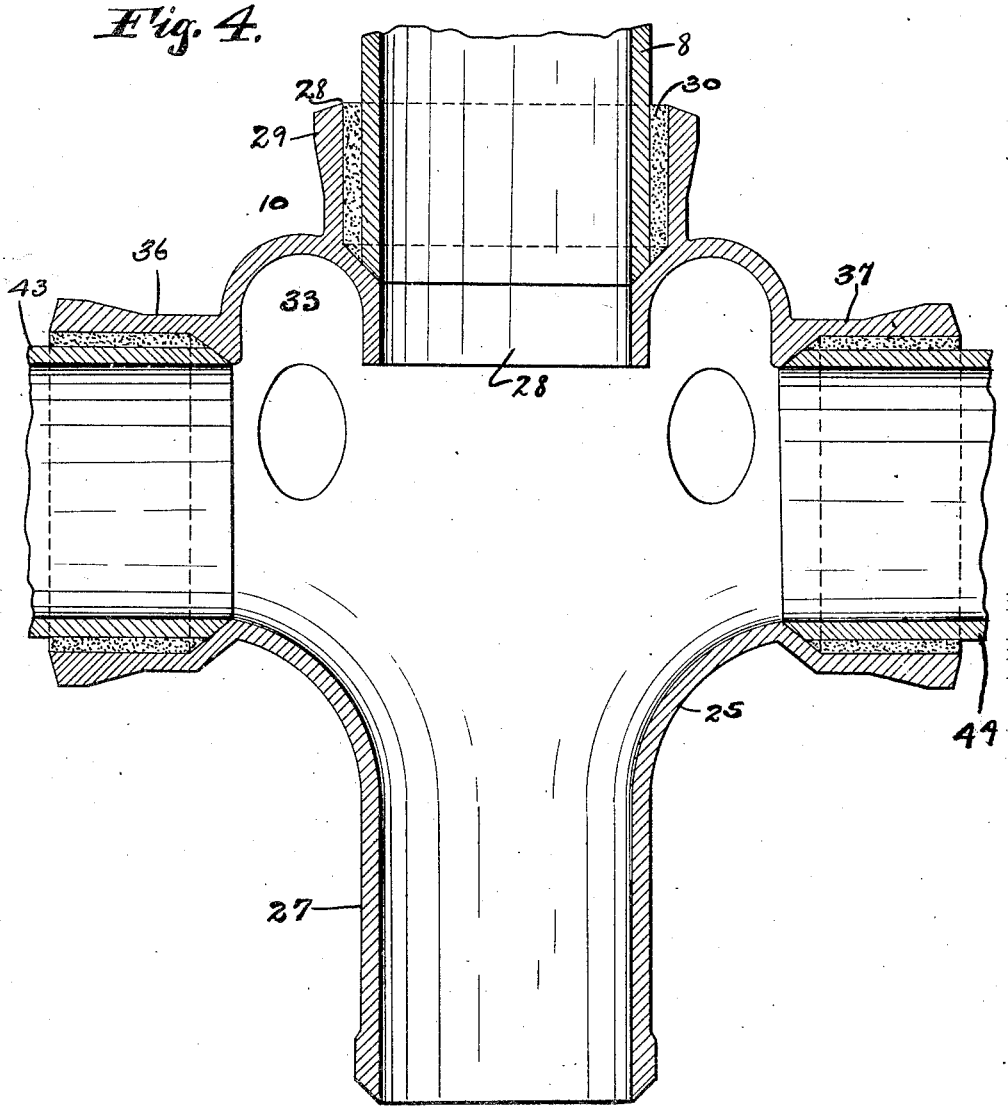

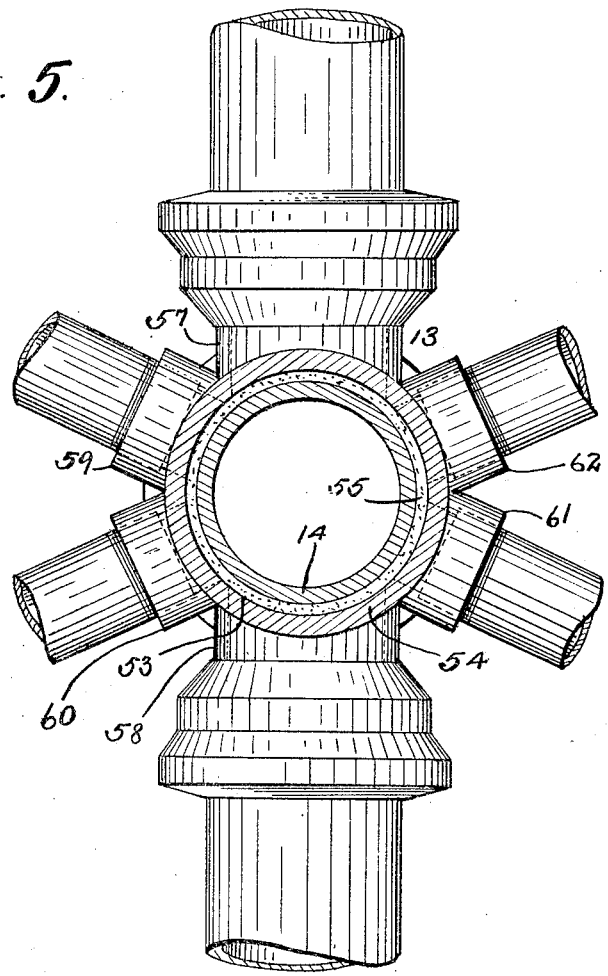

UNITED STATES PATENT OFFICE.

HENRY J. LUFF, OF CLEVELAND, OHIO, ASSIGNOR TO FRUIN & WALKER COMPANY, OF CHICAGO, ILLINOIS, A CORPORATION OF ILLINOIS.

WASTE AND VENT PIPE FITTING.

1,097,982.        Specification of Letters Patent.        Patented May 26, 1914.

Application filed June 24, 1912. Serial No. 705,379.

*To all whom it may concern:*

Be it known that I, HENRY J. LUFF, a citizen of the United States of America, residing at Cleveland, in the county of Cuyahoga and State of Ohio, have invented certain new and useful Improvements in Waste and Vent Pipe Fittings; and I hereby declare the following to be a full, clear, and exact description of the invention, such as will enable others skilled in the art to which it pertains to make and use the same.

This invention relates to new and useful improvements in waste and vent pipe fittings.

The object of this invention is to provide a fitting to be used as a connection between a vertical waste pipe and a series of lateral branches which will effectually prevent the siphonage of the traps at the ends of the said branches.

My invention therefore consists in the features of construction and combination of parts, the preferred form of which is illustrated in the drawings, described in the specification and particularly pointed out in the claims.

In carrying out my invention in practical use I provide one embodiment thereof which is designed to be used only on the highest floor of a building and another embodiment which is designed to be used on all the lower floors. The fitting designed for use on the highest floor is arranged so that the water closet waste pipe and waste pipes from other fixtures may enter the vertical pipe directly and separately with the tops of the branches all on the same level and each branch therefore may independently receive air from the vent pipe immediately above in sufficient quantities to effectually prevent the siphonage of the trap at the end thereof. The fitting which is designed to be used on all floors below the top floor is provided with a revent chamber, the bottom of which is in open communication with the interior of the fitting and the closet waste pipes and the waste pipes from the other fixtures enter the fitting immediately below the revent chamber with their tops all on the same level and therefore each waste pipe receives air directly and independently from the revent chamber and the said revent chamber receives air independently by means of a revent pipe communicating directly therewith and independent of the waste pipe.

In the accompanying drawings Figure 1 is a view in elevation showing the bath-room fixtures on two floors, the highest and the floor next below. Fig. 2 is a section on line 2—2, Fig. 1. Fig. 3 is a section on line 3—3, Fig. 2. Fig. 4 is a section on line 4—4, Fig. 3. Fig. 5 is a section on line 5—5, Fig. 1.

Referring now particularly to Fig. 1, which shows the general arrangement and installation of both forms of my fitting, 1 represents the top floor of a building and 2 represents the floor immediately below, 3 represents the bath-tub and 4 a wash-stand on the top floor, and 5 represents a bath-tub and 6 a wash-stand on the lower floor. 8 represents a vertically arranged soil-pipe which extends from the sewer connection to the top floor, the said soil pipe being formed, as is customary, of a number of sections, and between said sections at each floor is arranged one of my improved fittings, the fitting indicated by 10 being the style of fitting which is used at all floors below the top floor and the fitting shown at 13 being the fitting that is used at the top or highest floor. 14 represents the main vent pipe and it extends up from the topmost fitting and is practically a continuation of the soil pipe, but no waste passes down therethrough. 16 represents the waste pipe from the bath-tub 3 to the fitting 13 and 17 represents the waste pipe from the stand 4 to the fitting 13, and in the waste pipe 16 is a trap 16' and in the waste pipe 17 is a trap 17'. In a similar way the bath-tub 5 is connected with the fitting 10 by a waste pipe 19 and the stand 6 is connected with the fitting 10 by a waste pipe 20. In the waste pipe 19 is a trap 19' and in the waste pipe 20 is a trap 20'.

Referring more particularly to Figs. 2, 3 and 4 of the drawings, wherein the form of my fitting suitable for all floors but the top floor is illustrated, it will be seen that the fitting before referred to as 10 comprises a hollow body portion 25 which is provided at its bottom with a hollow neck portion 27 which is made of suitable size to fit into the hub of the waste pipe. At the top of the body portion is formed an inlet opening 28 around which is arranged a flange 29 adapted to receive the lower end of the section of the soil-pipe above said fitting and a suitable seal 30 is arranged between the end of the soil-pipe and said flange to prevent the escape of gas. An annular flange extends downwardly from the inner surface of said fitting at the top thereof dividing the interior of said fitting at the upper part thereof into a passageway which forms a continuation of the top inlet opening and an annular revent chamber 33 which surrounds said passageway. The walls of this chamber are upwardly arched and the said chamber is in open communication with the interior of the fitting, there being no bottom wall whatever to the said chamber, and as there is no bottom wall to said chamber there is consequently no place wherein solids may lodge at any time which would impede the circulation of air in said chamber. Extending outwardly from the main body portion, just below the revent chamber are formed a number of connections. These connections are adapted to receive the waste pipes from the closet and from the other fixture. The connections 36 and 37 are the closet connections and the connections 38, 39, 40 and 41 represent the connections for the smaller waste-pipes from the bath-tubs, wash-stand and other fixtures. The tops of all these connections are level with each other so that they all communicate with the revent chamber equally in proportion to their size. The closet waste-pipes, indicated at 43 and 44, enter the connections 36 and 37 and the bath-tub and wash-stand waste-pipes enter the connections 38, 39, 40 and 41 so that the tops of all the waste pipes are in line with each other and therefore draw their air from the revent chamber from points which are all in the same horizontal plane. In the top of the revent chamber 33 is formed an air-inlet opening 45, and from this opening an auxiliary ventilating pipe extends upwardly, and, as shown in the drawings, enters the main vent pipe 14.

The fitting 13 for the fixtures on the top floor is, in its general form, similar to the construction already described, having a hollow body portion 50 which is provided at its bottom with a neck portion 51 which is made of suitable size to fit into the hub of the waste-pipe section next below. At the top of the body portion is formed an inlet opening 53 around which is arranged a flange 54 adapted to receive the lower end of the vent pipe 14 and a suitable seal 55 is arranged between the end of the vent pipe and said flange. No revent chamber is provided in this fitting, the connections for the waste pipes extending outwardly just below the opening to the vent pipe. These connections are all separate so that they can draw their air independently from the vent-pipe and the tops of all the connections are level with each other. In Fig. 5, where this connection is most clearly shown, 57 and 58 represent the closet connections, and 59, 60, 61 and 62 represent the connections for the smaller waste pipes.

I have shown the waste-pipe entering the fittings horizontally, but I do not confine myself to any particular angle at the point where they enter the fittings, as the gist of my invention is the arrangement of the waste-pipe entering the fittings separately and with their tops in the same horizontal line.

What I claim is,—

1. A waste-pipe fitting constructed at top and bottom for connection with the pipe sections of a ventilated sewerage system for buildings, and having intermediate its ends a plurality of inlet connections of more than one size the internal diameters of which are in the same horizontal plane at top and in the same or different horizontal planes at bottom, according to the diameters of said connections.

2. The combination with a plurality of soil pipes from closet bowls and waste pipes from tubs and other fixtures; and a vertically arranged sectional soil pipe, of a fitting comprising a body portion which is provided at its top with an inlet connection for the lower end of one section of the soil pipe and at its bottom with an outlet connection for the upper end of the next lower section of the soil pipe, and at its side with a series of inlet connections for the waste and soil pipes, said body portion having an interior annular flange extending downwardly from the top, said annular flange together with the top wall of the fitting and the adjacent portion of the side wall forming an annular revent chamber around the top inlet connection and above the side inlet connections, said fitting having in the wall thereof a vent opening which communicates directly and independently with said annular chamber.

3. The combination with a plurality of soil pipes and waste pipes from closet bowls and other fixtures and a vertically arranged sectional soil pipe, of a fitting adapted to connect the sections of the soil pipe and receive the ends of the waste and soil pipes, said fitting comprising a body portion which is provided at its top with an inlet connection for the lower end of one section of the vertical soil pipe and at its bottom with an outlet connection for the upper end of the next lower section of the vertical soil pipe, said connections being in vertical alinement and at its side with a series of inlet connections for the waste and soil pipes, said body portion having an interior annular flange extending downwardly from the top and forming a continuation of the said top inlet connection, said annular flange together with the top wall of the fitting and the adjacent portion of the side wall forming an annular revent chamber around the top inlet connection and above the side inlet connections, said fitting having in the wall thereof a vent opening which communicates independently with said annular chamber.

4. The combination with a plurality of soil pipes and waste pipes from closet bowls and other fixtures and a vertically arranged sectional soil pipe, of a fitting comprising a hollow body portion which is provided at its top and bottom with connections for the waste and soil pipes, said fitting being also provided in its interior at the top thereof with an annular revent chamber arranged around the top inlet connection and above the side inlet connections, said annular revent chamber being entirely open at its bottom and having in the wall thereof a vent opening independent of the other openings in the side fitting.

5. A fitting of the character described comprising a hollow body portion having an inlet connection at its top, and outlet connection at its bottom and a series of inlet connections around the side and an interior annular flange extending downwardly from the top around the top inlet connection and dividing the interior of the upper part of said fittig into a central passageway and an annular revent chamber around the said passageway, said revent chamber having a vent opening in the upper part thereof independent of said passageway.

In testimony whereof, I sign the foregoing specification, in the presence of two witnesses

HENRY J. LUFF.

Witnesses:
VICTOR C. LYNCH,
N. L. McDARNELL.